United States Patent
Jeon

(10) Patent No.: US 6,416,440 B1
(45) Date of Patent: Jul. 9, 2002

(54) SEMI-AUTOMATIC POWER SHIFT TRANSMISSION AND SHIFT CONTROL METHOD THEREOF

(75) Inventor: Yong Cheol Jeon, Incheon (KR)

(73) Assignee: Daewoo Heavy Industries Ltd., Incheon (KR)

( * ) Notice: Subject to any disclaimer, the term of this patent is extended or adjusted under 35 U.S.C. 154(b) by 0 days.

(21) Appl. No.: 09/606,693

(22) Filed: Jun. 30, 2000

(30) Foreign Application Priority Data

Jun. 30, 1999 (KR) ............................................ 99-25596

(51) Int. Cl.⁷ ..................... F16H 59/30; F16H 61/00
(52) U.S. Cl. ..................................... 477/123; 477/118
(58) Field of Search .............................. 477/118, 123, 477/124, 903

(56) References Cited

U.S. PATENT DOCUMENTS

| | | | | |
|---|---|---|---|---|
| 4,425,620 A | * | 1/1984 | Batcheller et al. | 477/123 X |
| 4,561,327 A | * | 12/1985 | Niwa et al. | 477/118 |
| 4,622,866 A | * | 11/1986 | Ito et al. | 477/123 X |
| 5,089,962 A | * | 2/1992 | Steeby | 477/124 X |
| 5,257,189 A | * | 10/1993 | Asada | 364/424 |
| 5,425,689 A | * | 6/1995 | Genise | 477/118 X |
| 5,618,243 A | * | 4/1997 | Kondo et al. | 477/118 |
| 5,766,111 A | * | 6/1998 | Steeby et al. | 477/124 |
| 5,873,802 A | * | 2/1999 | Tabata et al. | 477/96 |
| 5,921,889 A | * | 7/1999 | Nozaki et al. | 477/158 |
| 5,974,354 A | * | 10/1999 | Janecke et al. | 477/124 X |

FOREIGN PATENT DOCUMENTS

EP                565257 A1 * 10/1993 ................. 477/124

* cited by examiner

*Primary Examiner*—Charles A. Marmor
*Assistant Examiner*—Roger Pang
(74) *Attorney, Agent, or Firm*—Lowe Hauptman Gilman & Berner, LLP

(57) ABSTRACT

A semi-automatic power shift transmission for use in a forklift truck includes a manual shift lever with first and second gear positions, a hydraulically shifted transmission gear mechanism operable in one of first and second gear ratios corresponding to the first and second gear positions, a plurality of solenoids for, when energized, causing the transmission gear mechanism to be either up-shifted from the first to the second gear ratio or down-shifted from the second to the first gear ratio, a transmission speed sensor for detecting the output speed of the transmission gear mechanism to generate a transmission speed signal, an engine speed sensor for picking up the speed of a vehicle engine to produce an engine speed signal, a steering wheel angle sensor for measuring the steering wheel angle to issue a wheel angle signal, and a transmission control unit responsive to the transmission speed signal, the engine speed signal and the wheel angle signal for selectively energizing the solenoids to thereby carry out the up-shifting operation in the event that a load ratio calculated by dividing the transmission speed with the engine speed is greater than a preselected reference load ratio, with the transmission speed larger than a preselected reference up-shift speed and the steering wheel angle smaller than a preselected reference angle. Also disclosed is a novel shift control method of the power shift transmission noted above.

13 Claims, 5 Drawing Sheets

SEMI-AUTOMATIC POWER SHIFT TRANSMISSION AND SHIFT CONTROL METHOD THEREOF

FIELD OF THE INVENTION

The present invention is directed generally to a power shift transmission and more specifically to a semi-automatic power shift transmission for use in such an industrial vehicle as forklift trucks of the type allowing an automatic shifting operation to be performed at a controlled shift point of time, regardless of the driver's untimely shifting command which may cause an overheat and damage of the transmission. The invention also discloses a shift control method that assures a well-timed, smooth shifting operation of a semi-automatic power shift transmission.

BACKGROUND OF THE INVENTION

As ordinary artisan are aware, industrial vehicles such as a forklift truck have been employed for the load shipping purpose or for the transportation of heavyweight articles from one place to another, usually within a limited working area, The industrial vehicles normally employ a power shift transmission to perform gear shifting between a forward gear, a reverse gear and a neutral gear by use of fluid pressure. The transmission can be up-shifted or down-shifted in the forward gear between first and second gear ratios.

For the explanation of conventional power shift transmissions typically incorporated in the forklift truck, certain major components associated with the gear shifting operation are illustrated in FIG. 1 by way of example.

As illustrated, the forklift truck includes a starter switch 10, an engine 12, a shift lever 14, a transmission control unit 16, a torque converter 17 and a transmission main body 18 equipped with three solenoid valves 20, 22, 24. The starter switch 10 can be manually actuated to energize a start motor(not shown) which in turn provides initial driving force to the engine 12. The shift lever 14 is manipulated by the driver to select a proper gear ratio of the truck. The information on the gear ratio selected by the driver is given to the transmission control unit 16.

The transmission control unit 16 is adapted to generate and feed control signals to the three solenoid valves 20, 22, 24 on the basis of the information obtained from the shift lever and other sensors. The solenoid valves 20, 22, 24 are selectively energized or de-energized, depending upon the control signals from the transmission control unit 16. Combination of energization and de-energization of the solenoid valves 20, 22, 24 establishes a particular hydraulic circuit, thus changing the gear ratio of a planetary gear device within the transmission main body 18.

It is widely known in the art that the torque converter 17 serves to provide torque multiplication and hydrodynamic damping benefits in transmitting power from the engine 12 to the transmission main body 18. In the meantime, the stop lover 26 can be optionally operated during the course of shifting operation either to temporarily stop the engine 12 or reduce the engine output power by virtue of restricting fuel supply to the engine 12. This helps avoid shift shock which would otherwise take place in the shifting operation.

The typical power shift transmission of the construction as set forth above, however, has a shortcoming in that the transmission tends to be overheated and eventually damaged as it is frequently exposed to untimely shifting operation. Specifically, there are many instances where the forklift truck driver tries to change the gear ratio in an untimely manner at an improper travelling speed of the forklift truck, which may lead to an increased shift shock and an exceedingly high heat generation in the torque converter.

In case of the forklift truck among other industrial vehicles, it has come to the inventor's attention that the angle of a steering wheel should be taken into account to inhibit any up-shift at a great steering angle which would otherwise result in an excessive heat generation in various parts of the transmission and, sometimes, traffic accidents due to the quickly increased truck speed at a heavy steering angle.

SUMMARY OF THE INVENTION

Accordingly, it is an object of the invention to provide a semi-automatic power shift transmission for use in an industrial vehicle and a shift control method thereof capable of automatically changing or shifting the gear ratio at a well-controlled shift time and with a reduced shift shock.

Another object of the invention is to provide a semi-automatic power shift transmission for use in an industrial vehicle and a shift control method thereof which can take into consideration the steering wheel rotation angle to avoid any up-shift of the gear ratio at a great steering angle.

With these objects in view, one aspect of the present invention lies in the provision of a semi-automatic power shift transmission for use in an industrial vehicle, comprising: a manual shift lever with at least first and second gear positions; a hydraulically shifted transmission gear mechanism operable in one of at least first and second gear ratios corresponding to the first and second gear positions; electromagnetic actuator means for, when energized, causing the transmission gear mechanism to be either up-shifted from the first to the second gear ratio or down-shifted from the second to the first gear ratio; a transmission speed sensor for detecting the output speed of the transmission gear mechanism to generate a transmission speed signal; an engine speed sensor for picking up the speed of a vehicle engine to produce an engine speed signal; a steering wheel angle sensor for measuring the steering wheel angle to issue a wheel angle signal; and a transmission control unit responsive to the transmission speed signal, the engine speed signal and the wheel angle signal for selectively energizing the electromagnetic actuator means to thereby carry put the up-shifting operation in the event that a load ratio denoting the transmission speed divided by the engine speed is greater than a preselected reference ratio, with the transmission speed larger than a preselected reference up-shift speed and the steering wheel angle smaller than a preselected reference angle.

Another aspect of the present invention resides in the provision of a shift control method of a semi-automatic power shift transmission for use in an industrial vehicle, comprising the steps of: a) detecting the output speed of a transmission gear mechanism to generate a transmission speed signal; b) picking up the speed of a vehicle engine to produce an engine speed signal; c) calculating a load ratio by way of dividing the transmission speed with the engine speed; d) determining whether the calculated load ratio is greater than a preselected reference load ratio; e) if the answer at step d) is affirmative, determining whether the transmission speed is greater than a preselected reference up-shift speed; f) if the answer at step e) is affirmative, measuring the angle of a steering wheel and determining whether the steering wheel angle is loss than a preselected reference angle; and g) if the answer at step f) is affirmative, executing the up-shift operation of the transmission gear mechanism from a first gear ratio to a second gear ratio.

BRIEF DESCRIPTION OF THE DRAWINGS

Other objects, features and advantages of the invention will become apparent from the following description of the preferred embodiment taken in conjunction with the accompanying drawings in which.

DETAILED DESCRIPTION OF THE PREFERRED EMBODIMENT

Figure 1:
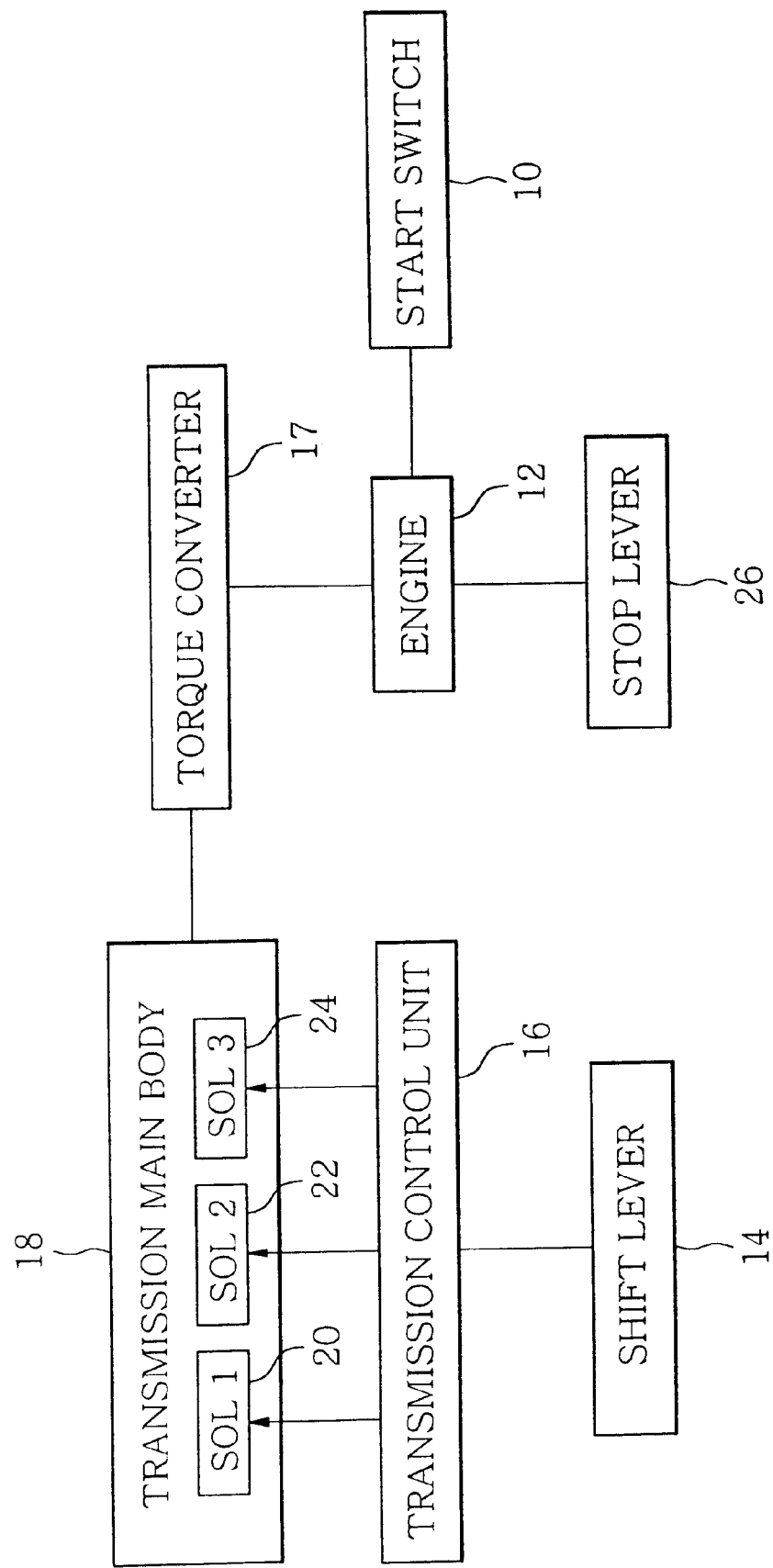
FIG. 1 is a block diagram showing a prior art power shift transmission and major components associated therewith.
Figure 2:
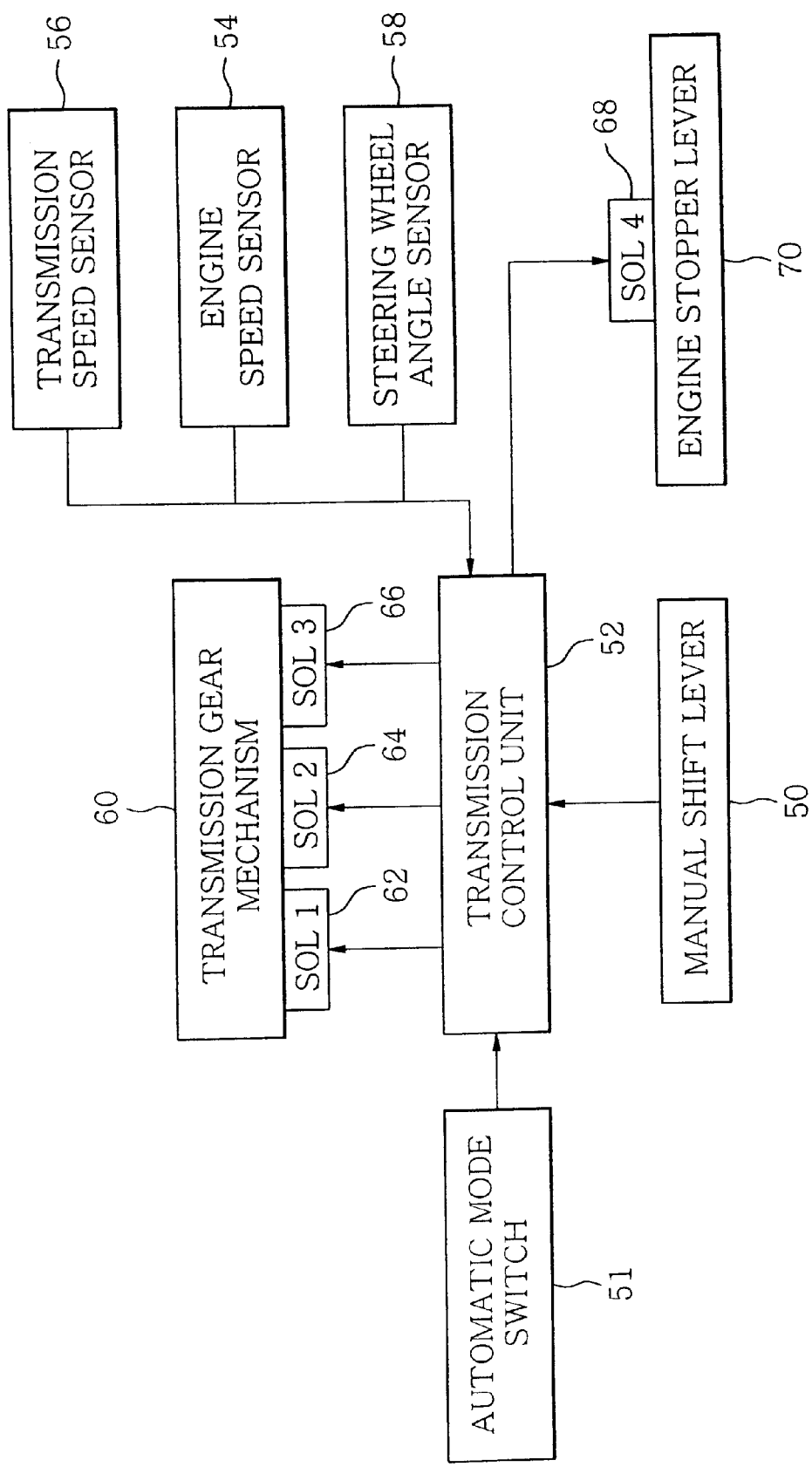
FIG. 2 depicts a block diagram of the inventive semi-automatic power shift transmission for use in a forklift truck and related truck components.

Referring now to FIG. 2, it should be appreciated that a semi-automatic power shift transmission for use in a forklift truck illustrated in the drawings is of the type having two forward gear ratios, two reverse gear ratios and a neutral mode, but the invention shall not be limited to the embodiment illustrated.

The inventive semi-automatic power shift transmission includes a manual shift lover 50, an automatic mode switch 51, a transmission control unit 52, an engine speed sensor 54, a transmission output speed sensor 56, a steering wheel angle sensor 58, a hydraulically shifted transmission gear mechanism 60, first through fourth solenoids 62, 64, 66, 68, and. an engine stopper lever 70.

The manual shift lever 50 is used in a manual shift mode and movable between first and second gear positions. The automatic mode switch 51 is switched on by the driver, when he or she wants to rely upon an automatic shift function whereby the gear ratio or speed ratio of the forklift truck can be automatically changed at a proper shifting point of time. When the automatic mode switch 51 is switched off, the power shift transmission of the forklift truck serves as a manually controlled power shift transmission with no automatic gear shift function.

The transmission control unit 52 serves to generate control signals based on various input signals or data and feed them to the individual solenoids 62, 64, 66, 68. It should be noted that the transmission control, unit 52 is composed of a central processing unit (CPU), memories (RAM and ROM) and an input/output interface, etc., although not shown in the drawings for simplicity.

In accordance with the present invention, the input signals of the transmission control unit 52 come from the manual shift lever 50, the automatic mode switch 51, the engine speed sensor 54, the transmission output speed sensor 56 and the steering wheel angle sensor 58. Whenever the shift lever 50 is moved from one position to another by the driver, the corresponding lever position signal is forwarded to the transmission control unit 52. Furthermore, an on/off signal of the automatic mode switch 51 is supplied to the transmission control unit 52. The engine speed sensor 54 is adapted to pick up the rotation-per-minute (RPM) of a crank shaft (not shown) of the engine and send the corresponding engine speed signal to the transmission control unit 52. The transmission output speed sensor 56 detects the rotation-per-minute of an output shaft (not shown) of the inventive transmission. The detected transmission output speed signal indicative of the actual truck speed is provided to the transmission control unit 52. The steering wheel angle sensor 58 detects the rotation angle of a steering column (not shown) of a steering wheel to thereby feed the detected wheel angle signal to the transmission control unit 52. Based on the input signals referred to above, the transmission control unit 52 will produce control signals which are to be supplied to the solenoids 62, 64, 66, 68.

The first through third solenoids 62, 64, 66 that function as electromagnetic actuators are operable to establish a particular one of various hydraulic connections which decides the gear ratio of the transmission gear mechanism 60. To be more specific, each of the first through third solenoids 62, 64, 66 is either energized or de-energized depending on the control signals from the transmission control unit 52. The combination of energization and de-energization of the first through third solenoids 62, 64, 66 provides at least five different gear ratios and modes, including a first forward gear ratio, a second forward gear ratio a first reverse gear ratio, a second reverse gear ratio and a neutral gear mode, although the invention is not limited thereto but may be applicable to other type of forklift truck transmissions.

The fourth solenoid 68 functions to actuate the engine stopper lever 70 in response to a control signal from the transmission control unit 52. The stopper lever 70 is used to temporarily stop the engine 12 or reduce its output power during the course of shifting operation by blocking or restricting the fuel supply into a combustion chamber (not shown) of the engine. This helps assure smooth shifting operation with little shift shock With reference to FIGS. 3 through 5, the shift control method performed by the above-mentioned power shift transmission is now set forth in detail. The inventive power shift transmission is designed to automatically perform an up-shifting operation as the travelling speed of the forklift truck is increased. In the up-shift process, even if the driver manipulates the shift lever 50 toward the second gear position while the truck speed remains below a proper up-shifting point, the actual shifting operation will not occur until and unless the travelling speed of the truck exceeds the proper up-shifting point. Likewise, the inventive transmission is adapted to automatically carry out a down-shifting operation as the travelling speed of the vehicle is decreased. Even in a case where the driver does not manipulate the shift lever 50 toward the first gear position, the down-shifting operation occurs automatically at a proper down-shift point. Such an automatic down-shifting operation enables the truck to restart with the first gear ratio at all times, even when the shift lever 50 is in the second gear position.

Figure 3:
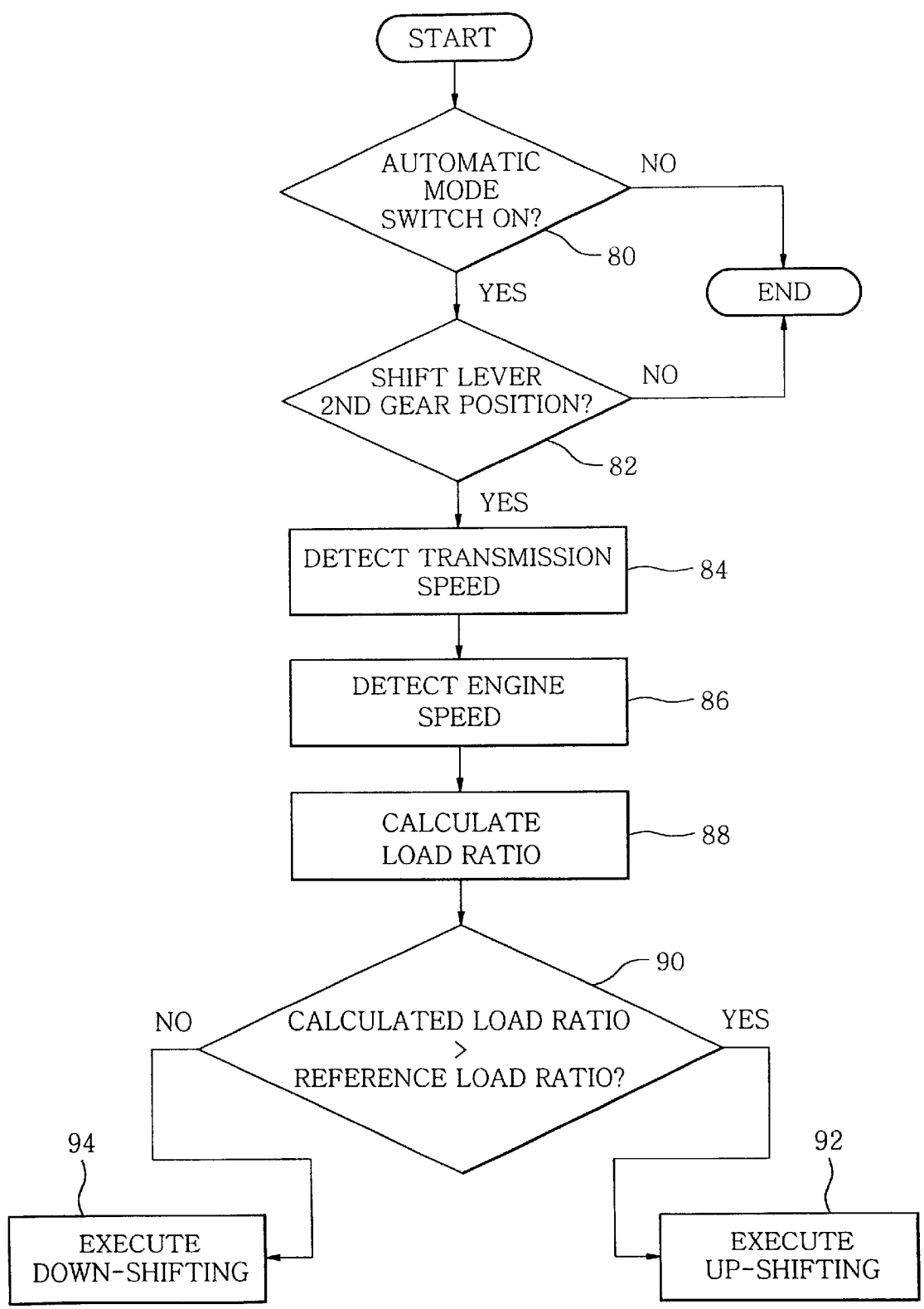
FIG. 3 is a flow chart showing an up-shift and down-shift determination process in the shift control method in accordance with the present invention.

Turning to the flow chart shown in FIG. 3, initially, the transmission control unit 52 checks if the automatic mode switch 51 is switched on in step 80. If the answer is affirmative, step 82 is performed wherein the transmission control unit 52 checks if the manual shift lever 50 lies in the second gear position. In accordance with the present invention, the automatic shift function does not work as far as the shift lever 50 is placed in the first gear position.

If the shift lever 50 is determined to be in the second gear position, steps 84 and 86 are executed to pick up the transmission output shaft speed and the engine speed. Then, the transmission control unit 52 calculates the load ratio Lr in step 88 which is defined by following equation:

$$Lr = \frac{tRPM}{eRPM}$$

wherein tRPM means the speed of the transmission output shaft detected in step 84 and eRPM denotes the engine speed picked up in step 86.

In step 90, the transmission control unit 52 will compare the calculated load ratio with a preselected reference load ratio, Examples of the reference load ratio and the corresponding up-shifting and down-shifting speeds are shown in table 1 below. As illustrated in the table, the reference load ratios range from 0 to 1.

TABLE 1

| Reference Load Ratios | 1.00 | 0.75 | 0.50 | 0.25 | 0.00 |
|---|---|---|---|---|---|
| Up-shifting Speed (Km/h) | 2.00 | 2.80 | 3.00 | 3.60 | 4.00 |
| Down-shifting Speed (Km/h) | 1.50 | 1.75 | | | 2.00 |

The above table is empirically prepared by the truck manufacturer; and the manufacturer or the driver can set one reference load ratio as a default value. For example, the reference load ratios may be displayed on a dash board of the forklift truck to permit the driver to choose or select one reference ratio at his or her desire. Each of the reference load ratios has corresponding reference upshifting and downshifting speeds at which the gear shifting operation proceeds automatically.

As shown in table 1 above, it is worth noting that the down-shifting speed and the up-shifting speed which share one and the same reference load ratio differ significantly from each other. This is to avoid "a chattering phenomenon" which would take place otherwise. In other words, different speed thresholds are applied to the up-shift and the down-shift processes such that an up-shift curve and a down-shift curve can form a so-called hysteresis loop.

Referring back to FIG. 3, if the calculated load ratio is greater than the preselected reference load ratio, then the up-shifting operation is executed in step 92, whereas the down-shifting operation is performed in step 94 in case of the calculated load ratio being less than the reference load ratio.

Figure 4:
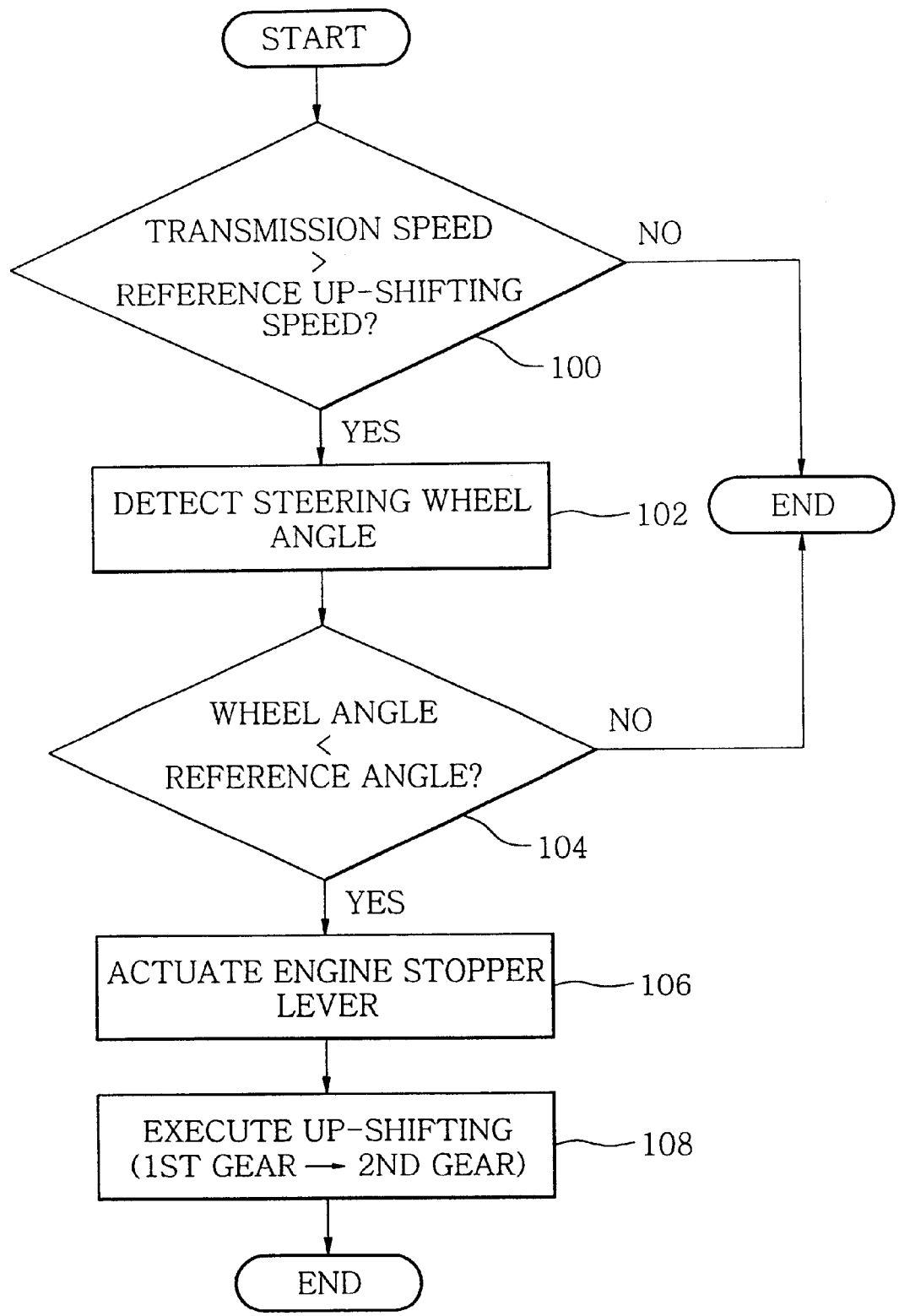
FIG. 4 is a flow chart depicting an up-shift execution process in the inventive shift control method.

As best shown in FIG. 4, the up-shifting operation involves stop 100 of determining whether the transmission speed, i.e., truck travelling speed, is greater than the preselected reference up-shifting speed. If the answer is in the affirmative, then the steering wheel angle will be detected in step 102. Determination is made in step 104 as to whether the steering wheel angle is smaller than the preselected reference angle. If yes, the transmission control unit 52 will actuate the engine stopper lever 70 with the use of the fourth solenoid 68 in step 106 to thus temporarily reduce the engine output power. This ensures that the up-shifting operation from the first gear ratio to the second one is performed smoothly with little shift shock in step 108.

Figure 5:
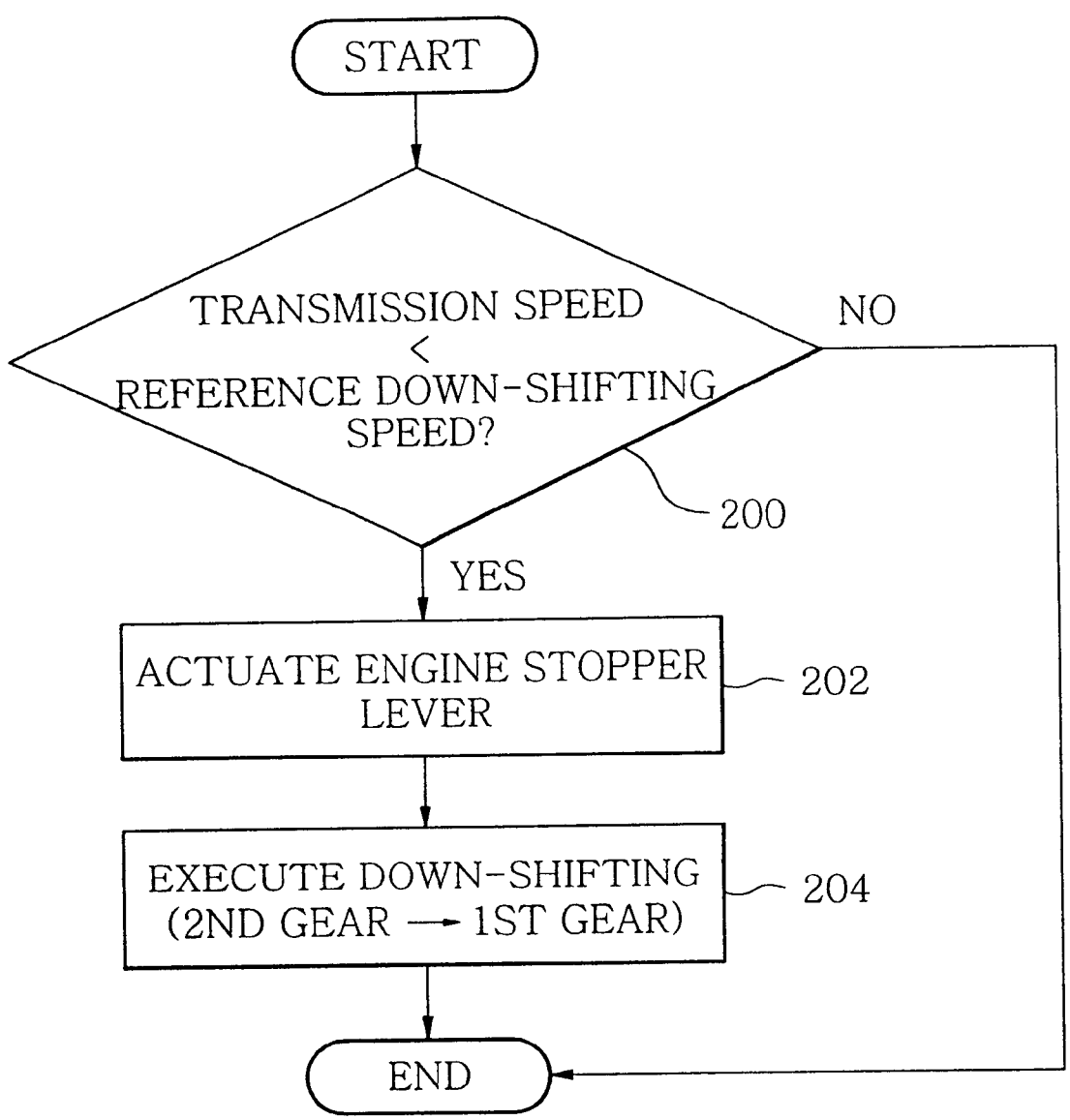
FIG. 5 is a flow chart illustrating a down-shift execution process in the inventive shift control method.

Turning to FIG. 5, there is shown the down-shifting process which includes stop 200 of checking if the transmission speed, i.e., truck travelling speed, is smaller than the preselected reference down-shifting speed. In the event that the answer is in the affirmative, then the transmission control unit 52 will actuate the engine stopper lever 70 with the use of the fourth solenoid 68 in step 202 to thus reduce the engine output power. This makes it sure that the down-shifting operation from the second gear ratio to the first one is performed smoothly with little shift shock in step 204.

While the invention has been shown and described with reference to a preferred embodiment, it should be apparent to those skilled in the art that many changes ad modifications may be made without departing from the scope of the invention as defined in the claims.

What is claimed is:

1. A semi-automatic power shift transmission for use in an industrial vehicle, comprising:

a shift lever with at least first and second gear positions;

a hydraulically shifted transmission gear mechanism operable in one of at least first and second gear ratios corresponding to the first and second gear positions;

electromagnetic actuator means for, when energized, causing the transmission gear mechanism to be either up-shifted from the first to the second gear ratio or down-shifted from the second to the first gear ratio;

a transmission speed sensor for detecting the output speed of the transmission gear mechanism to generate a transmission speed signal;

an engine speed sensor for picking up the speed of a vehicle engine to produce an engine speed signal;

a steering wheel angle sensor for measuring the steering wheel angle to issue a wheel angle signal; and a transmission control unit responsive to the transmission speed signal, the engine speed signal and the wheel angle signal for energizing the electromagnetic actuator means to thereby carry out the up-shifting and the down-shifting operation, wherein the transmission control unit is adapted to perform the up-shifting operation in the event that a load ratio calculated by dividing the transmission speed with the engine speed is greater than a preselected reference load ratio, with the transmission speed larger than a preselected reference up-shift speed and the steering wheel angle smaller than a preselected reference angle.

2. The semi-automatic power shift transmission as recited in claim 1, wherein the transmission control unit is adapted to perform the down-shifting operation in the event that the calculated load ratio is less than a preselected reference load ratio, with the transmission speed being smaller than a preselected reference down-shift speed.

3. The semi-automatic power shift transmission as recited in claim 1, further comprising engine output reducer means for temporarily lowering down output power of the engine during the course of the gear shifting operation.

4. The semi-automatic power shift transmission as recited in claim 3, wherein the engine output reducer means comprises a stopper lever operable to temporarily reduce the fuel amount fed to the engine.

5. The semi-automatic power shift transmission as recited in claim 2, wherein the transmission control unit is adapted to cause the down-shifting operation and the upshifting operation only when the manual shift lever is in the second gear position.

6. The semi-automatic power shift transmission as recited in claim 1, further comprising an automatic mode switch manually actuated to allow the power shift transmission to be automatically controlled by virtue of the transmission control unit.

7. The semi-automatic power shift transfusion as recited in claim 1, wherein the electromagnetic actuator means comprises a plurality of solenoids.

8. A shift control method of a semi-automatic power shift transmission for use in an industrial vehicle, comprising the steps of:

a) detecting the output speed of a transmission gear mechanism to generate a transmission speed signal;

b) picking up the speed of a vehicle engine to produce an engine speed signal;

c) calculating a load ratio by way of dividing the transmission speed with the engine speed;

d) determining whether the calculated load ratio is greater than a preselected reference load ratio;

e) if the answer at step d) is affirmative, determining whether the transmission speed is greater than a preselected reference up-shift speed;

f) if the answer at step e) is affirmative, measuring the angle of a steering wheel and determining whether the steering wheel angle is less than a preselected reference angle; and g) if the answer at step f) is affirmative executing the up-shift operation of the transmission gear mechanism from a first gear ratio to a second gear ratio.

9. The shift control method of a semi-automatic power shift transmission as recited in claim 8, further comprising the steps of:

h) if the answer at stop d) is negative, determining whether the transmission, speed is smaller than a preselected reference down-shift speed; and i) if the answer at step h) is affirmative, performing the down-shift operation of the transmission gear mechanism from a second gear ratio to a first gear ratio.

10. The shift control method of a semi-automatic power shift transmission as recited in claim 9, wherein stops a) through i) are carried out in the event that an automatic mode switch is turned on with a manual shift lever moved to a second gear position.

11. The shift control method of a semi-automatic power shift transmission as recited in claim 9, further comprising the step of: j) temporarily reducing the output power of an engine during the course of carrying out steps g) and i) to thereby assure smooth shifting operation.

12. A shift control method of a semi-automatic power shift transmission for use in a forklift truck, comprising the steps of;

a) detecting the output speed of a transmission gear mechanism to generate a transmission speed signal;

b) picking up the speed of a truck engine to produce an engine speed signal;

c) calculating a load ratio by way of dividing the transmission speed with the engine speed;

d) determining whether the calculated load ratio is greater than a preselected reference load ratio;

e) if the answer at step d) is affirmative, determining whether the transmission speed is greater than a preselected reference up-shift speed;

f) if the answer at step e) is affirmative, measuring the angle of a steering wheel and determining whether the steering wheel angle is less than a preselected reference angle;

g) if the answer at stop f) is affirmative, executing the up-shift operation of the transmission gear mechanism from a first gear ratio to a second gear ratio;

h) if the answer at step d) is negative, determining whether the transmission speed is smaller than a preselected reference down-shift speed; and i) if the answer at step h) is affirmative, performing the down-shift operation of the transmission gear mechanism front a second gear ratio to a first gear ratio.

13. A semi-automatic power shift transmission for use in an industrial vehicle, comprising:

a shift lever with at least first and second gear positions;

a hydraulically shifted transmission gear mechanism operable in one of at least first and second gear ratios corresponding to the first and second gear positions;

electromagnetic actuator means for, when energized, causing the transmission gear mechanism to be either up-shifted from the first to the second gear ratio or down-shifted from the second to the first gear ratio;

a transmission speed sensor for detecting the output speed of the transmission gear mechanism to generate a transmission speed signal;

an engine speed sensor for picking up the speed of a vehicle engine to produce an engine speed signal;

a steering wheel angle sensor for measuring the steering wheel angle to issue a wheel angle signal;

a transmission control unit responsive to the transmission speed signal, the engine speed signal and the wheel angle signal for energizing the electromagnetic actuator means to thereby carry out the up-shifting and the down-shifting operation; and an engine output reducer means for temporarily lowering down output power of the engine during the course of the gear shifting operation, wherein the engine output reducer means comprises a stopper lever operable to temporarily reduce the fuel amount fed to the engine.

* * * * *